United States Patent
Lee et al.

(10) Patent No.: US 7,112,775 B2
(45) Date of Patent: Sep. 26, 2006

(54) COHERENT IMAGING THAT UTILIZES ORTHOGONAL TRANSVERSE MODE DIVERSITY

(75) Inventors: Gregory Steven Lee, Mountain View, CA (US); Robert C. Taber, Palo Alto, CA (US); Izhak Baharav, Palo Alto, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 194 days.

(21) Appl. No.: 10/966,313

(22) Filed: Oct. 14, 2004

(65) Prior Publication Data

US 2006/0081764 A1    Apr. 20, 2006

(51) Int. Cl.
*H01L 27/00* (2006.01)
(52) U.S. Cl. .................... 250/208.1; 250/559.4
(58) Field of Classification Search ........... 250/208.1, 250/216, 559.4
See application file for complete search history.

(56) References Cited

U.S. PATENT DOCUMENTS

| | | | |
|---|---|---|---|
| 5,543,809 A | | 8/1996 | Profera, Jr. |
| 5,729,374 A | | 3/1998 | Tiszauer et al. |
| 5,994,690 A | * | 11/1999 | Kulkarni et al. ............ 250/216 |

FOREIGN PATENT DOCUMENTS

WO    WO 2005/048174    5/2005

OTHER PUBLICATIONS

Partial European Search Report dated Jan. 24, 2006; pp. 1-2.
Toshiaki Iwai et al—"Speckle Reduction In Coherent Information Processing"; Proceedings of the IEEE, vol. 84, No. 5, May 1, 1996; pp. 765-781; XP000591804.
M. Bashkansky and J. Reintjes—"Statistics And Reduction Of Speckle In Optical Coherence Tomography"; Optic Letters, vol. 25, No. 8, Apr. 2000; pp. 545-547; XP002363428.
S. D. Silverstein and M. O'Donnell—"Speckle Reduction Using Correlated Mixed-Integration Techniques"; Pattern Recognition And Acoustical Imaging, SPIE Proceedings, vol. 768, Jan. 1978, pp. 168-172; XP009050017.
S. G. Mallat—"A Theory For Multiresolution Signal Decomposition: The Wavelet Representation"; IEEE Transactions On Pattern Analysis And Machine Intelligence, vol. 11, No. 7, Jul. 1989; pp. 674-693; XP002363435.

* cited by examiner

Primary Examiner—Que T. Le

(57) ABSTRACT

A technique for imaging an object with a coherent beam of electromagnetic radiation involves sequencing at least a portion of the coherent beam through a set of orthogonal transverse spatial modes and summing the output signals that result from set of orthogonal transverse spatial modes. To create an image of an object, the coherent beam is applied to multiple spots on the object and sequenced through the same set of orthogonal transverse spatial modes at each spot. The output signals generated from the sequencing are summed on a per-spot basis.

20 Claims, 5 Drawing Sheets

COHERENT IMAGING THAT UTILIZES ORTHOGONAL TRANSVERSE MODE DIVERSITY

BACKGROUND OF THE INVENTION

Imaging an object with a coherent beam of electromagnetic radiation is often plagued with the phenomenon of speckle, i.e., the randomly bright and dark grainy appearance of an image resulting from alternately constructive and destructive interferences over the aperture and the field of view. If the electromagnetic radiation source is perfectly coherent, the severity of the speckle will depend on three dimensionless parameters: the root-mean-square object roughness in terms of wavelengths, the average lateral spacing between surface features in wavelengths, and the number of features in the illumination area. Many kinds of laser illumination, particularly holography, invite the speckle problem because the number of features within the illumination area whose height deviates from the average height by approximately half an optical wavelength or more is enormous. In contrast to coherent imaging, incoherent imaging is immune to speckle since any set of optical paths from the source to the object to the detector (e.g., a retina, film, a CCD array) is only destructive for a fraction of the wavelengths involved.

Some techniques for dealing with speckle in coherent imaging systems utilize frequency diversity or angle diversity to reduce the occurrence of alternating constructive and destructive interference. Although these techniques can reduce speckle, the usefulness of frequency diversity is limited by a scarcity of spectrum in certain microwave regions of interest and the usefulness of angle diversity is limited by mechanical and cost considerations.

In view of this, what is needed is a coherent imaging technique that reduces speckle and that is efficient to implement.

SUMMARY OF THE INVENTION

A technique for imaging an object with a coherent beam of electromagnetic radiation involves sequencing at least a portion of the coherent beam through a set of orthogonal transverse spatial modes and summing the output signals that result from the set of orthogonal transverse spatial modes. To create an image of an object, the coherent beam is applied to multiple spots on the object and sequenced through the same set of orthogonal transverse spatial modes at each spot. The output signals generated from the sequencing are summed on a per-spot basis. Sequencing at least a portion of the coherent beam through a set of orthogonal transverse spatial modes at each spot adds orthogonal transverse mode diversity to the imaging system and reduces speckle in the acquired image information.

Other aspects and advantages of the present invention will become apparent from the following detailed description, taken in conjunction with the accompanying drawings, illustrating by way of example the principles of the invention.

BRIEF DESCRIPTION OF THE DRAWINGS

Throughout the description similar reference numbers are used to identify similar elements.

DETAILED DESCRIPTION

A technique for imaging an object with a coherent beam of electromagnetic radiation involves sequencing at least a portion of the coherent beam through a set of orthogonal transverse spatial modes and summing the output signals that result from the set of orthogonal transverse spatial modes. To create an image of an object, the coherent beam is applied to multiple spots on the object and sequenced through the same set of orthogonal transverse spatial modes at each spot. The output signals generated from the sequencing are summed on a per-spot basis.

Figure 1:
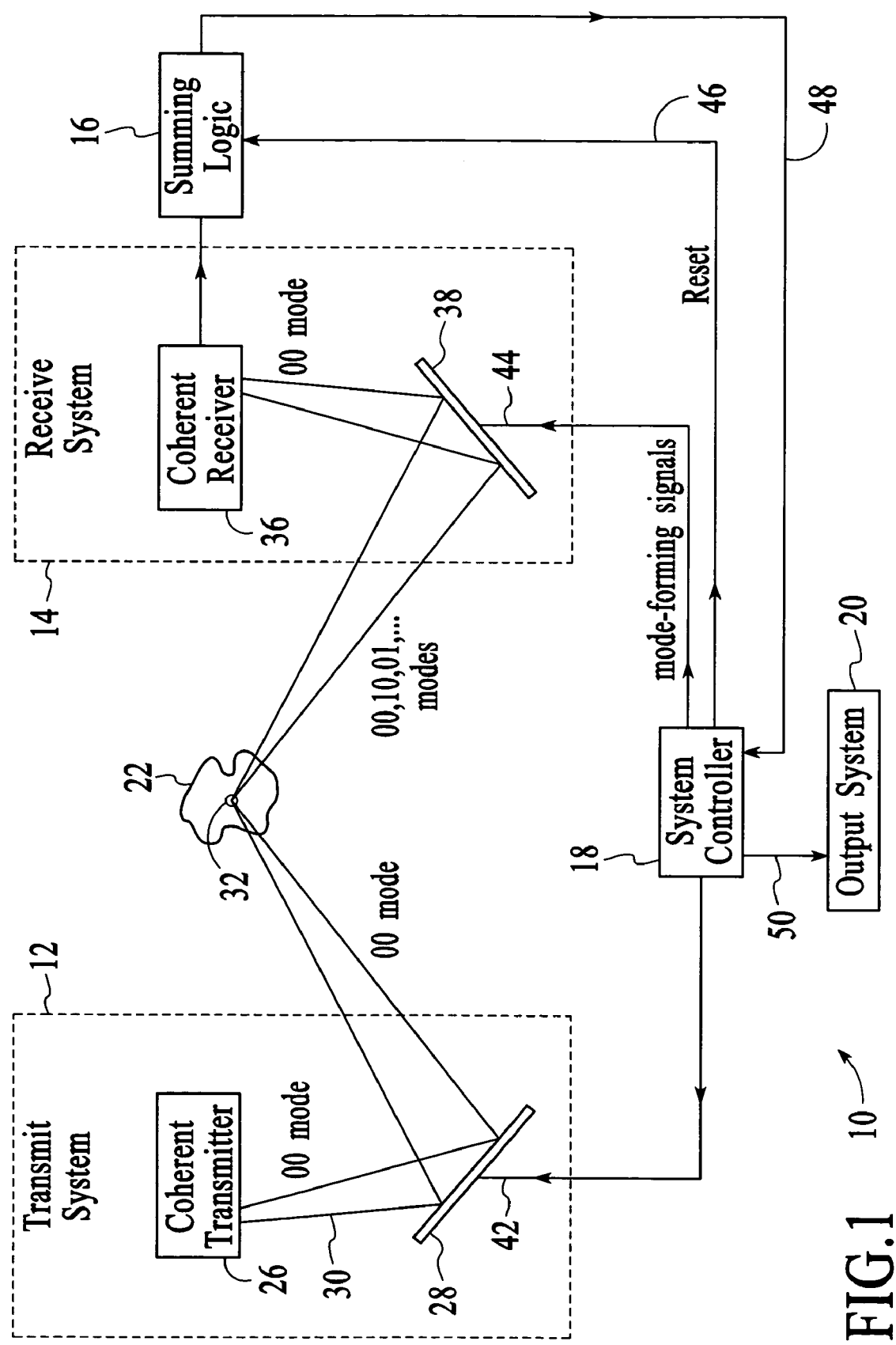
FIG. 1 depicts an embodiment of an imaging system that is configured to carry out coherent imaging utilizing orthogonal transverse mode diversity in accordance with an embodiment of the invention.

FIG. 1 depicts an embodiment of an imaging system 10 that is configured to carry out coherent imaging utilizing orthogonal transverse mode diversity. The imaging system includes a transmit system 12, a receive system 14, summing logic 16, a system controller 18, and an output system 20 that are configured to image an object 22. The transmit system includes a coherent transmitter 26 and a transmit beam controller 28. The coherent transmitter forms a coherent beam 30 of electromagnetic radiation that is directed towards the transmit beam controller. The portion of the coherent beam that exists between the coherent transmitter, the transmit beam controller, and the object is referred to herein as the "transmit beam." Although not shown, the coherent transmitter may include an electromagnetic radiation source and an antenna as is known in the field. In the embodiment described herein, the coherent transmitter generates electromagnetic radiation in the radio frequency (RF) range (e.g., from approximately 3 kHz to 300 GHz), although other ranges of electromagnetic radiation including the visible, x-ray, and infrared ranges are possible.

The transmit beam controller 28 is configured to receive the transmit beam from the coherent transmitter 26 and to focus the transmit beam onto a spot 32 on the object 22. The transmit beam controller is also configured to move the focus spot of the transmit beam in order to scan the object. The transmit beam controller can utilize mechanical or electrical control mechanisms to focus and move the transmit beam. Mechanical mechanisms that can be used include gimbals, lenses, mirrors, or any combination thereof. Electrical control mechanisms that can be used include phased arrays or reflectarrays. Other mechanisms for controlling the transmit beam are possible, including combinations of mechanical and electrical mechanisms. The transmit beam controller controls the coherent beam in response to signals from the system controller 18 as indicated by line 42.

The receive system 14 includes a coherent receiver 36 and a receive beam controller 38. The receive beam controller receives a portion of the coherent beam 30 that is reflected off of the object 22. Typically, the object has random surface irregularities that scatter the incident coherent beam such that only a portion of the incident coherent beam is reflected towards the receive system. Furthermore, the portion of the incident coherent beam that is reflected towards the receive system suffers phase front aberrations which can greatly diminish the actual received power. The portion of the coherent beam that exists between the object, the receive beam controller, and the coherent receiver is referred to herein as the "receive beam." During operation, the receive beam controller is focused onto the same spot 32 on the object as the transmit beam controller in order to maximize the resulting signal strength. The receive beam controller is also oriented with respect to its focus spot and the coherent receiver such that the receive beam is reflected towards the coherent receiver. The receive beam controller utilizes mechanical or electrical control mechanisms similar to the transmit beam controller to adjust the focus spot and to direct the reflected receive beam to the coherent receiver. The receive beam controller is adjusted in response to signals from the system controller 18 as indicated by line 44.

In accordance with the invention, the receive beam controller 38 is also configured to sequence the receive beam through a set of orthogonal transverse spatial modes, where orthogonal transverse spatial modes are defined generally as electromagnetic modes whose mutual overlap integrates to zero over the focal plane. Examples of orthogonal transverse spatial modes include the Hermite-Gaussian modes, which are described in more detail below with reference to FIGS. 5A–5D. Sequencing the receive beam through a set of orthogonal transverse spatial modes adds orthogonal transverse mode diversity to the imaging system 10, which as described below, reduces the speckle in the acquired image information. The receive beam controller uses mechanical mechanisms, electrical mechanisms, or any combination thereof to form the orthogonal transverse spatial modes. Electrical mechanisms such as phased arrays or reflectarrays are especially well-suited for the tasks of focusing a coherent beam, steering a coherent beam, and sequencing a coherent beam through a set of orthogonal transverse spatial modes. The signals that control the receive beam controller include mode-forming signals as indicated in FIG. 1.

The coherent receiver 36 receives the receive beam that is reflected off of the receive beam controller 38 and generates output signals in response. The output signals represent the power of the received electromagnetic radiation. The output signals are provided to the summing logic 16 for processing as analog or digital signals depending on the implementation. Although not shown, the coherent receiver may include an antenna and receiver electronics as is known in the field.

The summing logic 16 sums the output signals from the coherent receiver 36 and generates a summed value that represents the total power received. The summing logic is configured to sum analog or digital signals depending on the implementation. In an embodiment, the output signals are processed as digital signals. The summing logic may be hardware, software, or firmware based, or a combination thereof. As is described in more detail below, the summing logic is typically reset (in response to a reset signal from the system controller as indicated by line 46) for each new spot that is scanned. The summed values generated by the summing logic are provided to the system controller as indicated by line 48.

The system controller 18 controls the operation of the imaging system 10. In particular, the system controller manages the operations of the transmit and receive beam controllers 28 and 38 and the resetting of the summing logic 16. With respect to the transmit and receive beam controllers, the system controller provides control signals that cause the beam controllers to simultaneously focus onto the same spot 32 on the object 22 and to move the focus spot in order to scan the desired area of the object. The system controller also provides the control signals (i.e., mode-forming signals) to the receive beam controller that cause the receive beam to be sequenced through a set of orthogonal transverse spatial modes. Additionally, the system controller provides the reset signal to the summing logic, receives the summed values from the summing logic 16, and provides output signals (i.e., imaging information) to the output system 20 as indicated by line 50. In the embodiment of FIG. 1, the system controller is a microprocessor-based system that utilizes a combination of hardware and software to control the imaging system and to provide imaging information.

The output system 20 supports the output of imaging information from the system controller 18. The output system may include a display device, a printer device, a memory device or any combination thereof as is known in the field. In an embodiment, the imaging information is output as a graphically displayed image of the object. For example, in a security screening application where the object is a human body, the imaging information may be presented as a detailed image of the body in addition to certain objects (e.g., weapons, explosives, etc.) that may be on the body.

In operation, the imaging system 10 and object 22 are brought within an acceptable range of each other either by movement of the imaging system, movement of the object, or a combination of both. An acceptable range in a microwave application is dependent on the desired resolution. For higher spatial resolution, the range could be on the order of the diameter of the transmit/receive controller apertures. If spatial resolution is less of a concern, the range can be arbitrarily large. A coherent beam of electromagnetic radiation is formed by the coherent transmitter 26 such that the coherent beam 30 (i.e., the transmit beam) travels from the coherent transmitter to the transmit beam controller 28. The transmit beam controller reflects and focuses the transmit beam onto a spot 32 on the object. Some portion of the transmit beam is reflected off of the object towards the receive beam controller. As stated above, the portion of the coherent beam that exists between the object, the receive beam controller 38, and the coherent receiver 36 is referred to herein as the "receive beam." Because of the configuration of the receive beam controller, the receive beam is directed from the receive beam controller towards the coherent receiver. While the transmit and receive beam controllers are focused onto the same spot of the object, the receive beam controller sequences the receive beam through a set of orthogonal transverse spatial modes and the transmit beam controller maintains the transmit beam in a tightly focused node-free mode. In an example, the receive beam controller sequences the coherent beam through a set of 1–10 different orthogonal transverse spatial modes at each different spot depending on the implementation. The different modes of the receive beam are received at the coherent receiver. The output signals from the coherent receiver are provided to the summing logic and summed for the respective spot. The summed value for the respective spot is then provided to the system controller.

Once the receive beam controller 38 has completed sequencing through the set of orthogonal transverse spatial modes, the transmit and receive beam controllers 28 and 38 are adjusted to simultaneously focus onto a next spot on the object 22. Once focused on the next spot, the receive beam is sequenced through the same set of orthogonal transverse spatial modes and a new sum is accumulated and provided to the system controller. The process is repeated for as many spots as are desired. In a scanning operation, the system sequentially focuses the transmit and receive systems onto multiple spots of an object in a linear line-by-line fashion. The diversity provided by sequencing the receive beam through a set of orthogonal transverse spatial modes at each spot and summing the output signals on a per-spot basis reduces the speckle that results from imaging with a coherent beam of electromagnetic radiation.

Figure 2:
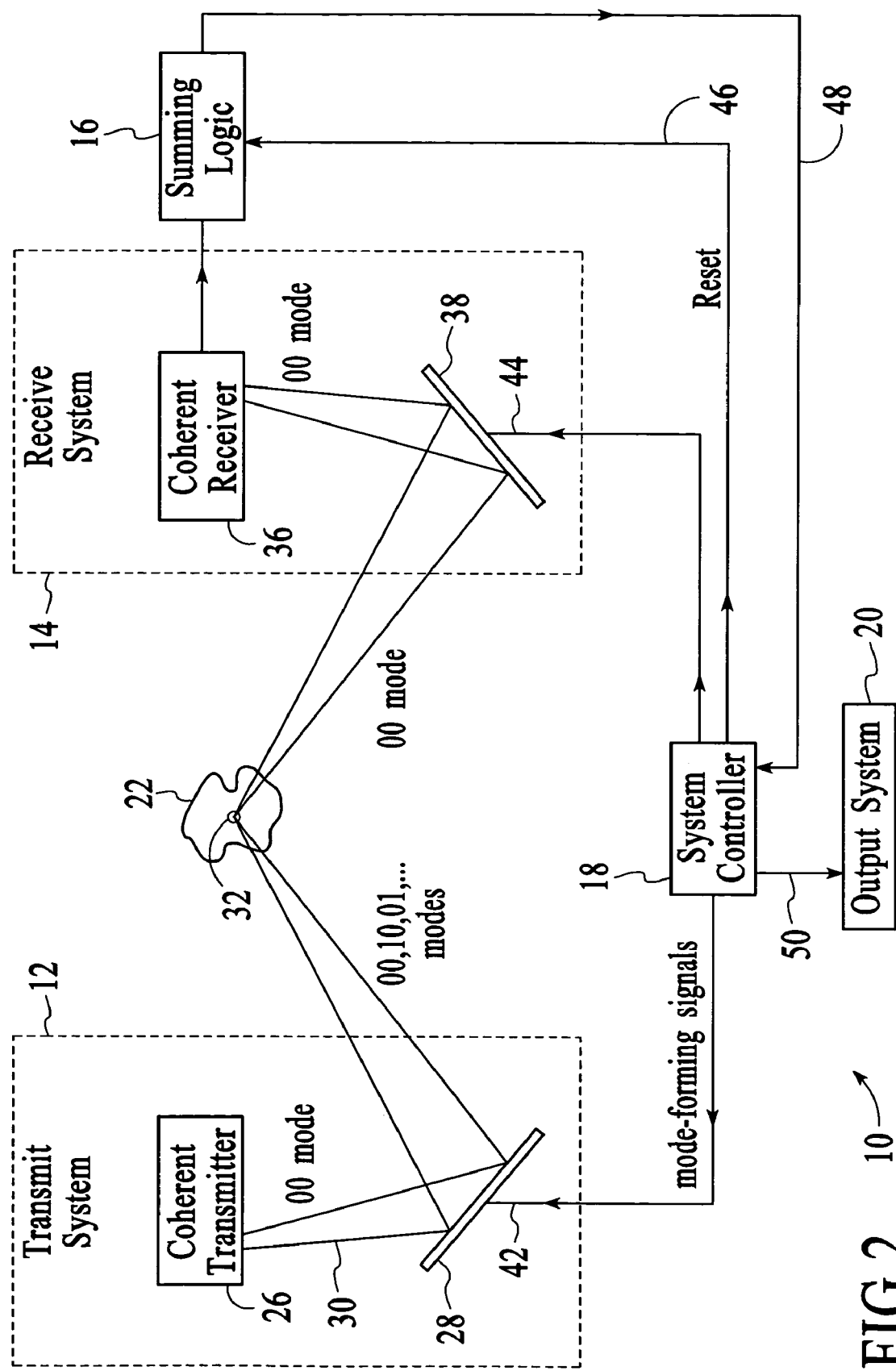
FIG. 2 depicts an embodiment of an imaging system in which the transmit beam controller is configured to sequence the coherent beam through the set of orthogonal transverse spatial modes instead of the receive beam controller.

In the embodiment of FIG. 1, the receive beam controller 38 is responsible for sequencing the receive beam through the set of orthogonal transverse spatial modes. Alternatively, the responsibility for sequencing at least a portion of the coherent beam through the set of orthogonal transverse spatial modes can be shifted to the transmit beam controller 28. FIG. 2 depicts an embodiment of an imaging system 10 in which the transmit beam controller is configured to sequence the transmit beam through the set of orthogonal transverse spatial modes instead of the receive beam controller. The operation of the imaging system of FIG. 2 is similar to the imaging system of FIG. 1 except that the orthogonal transverse spatial modes are formed at the transmit beam controller in response to mode-forming signals from the system controller 18.

Figure 3:
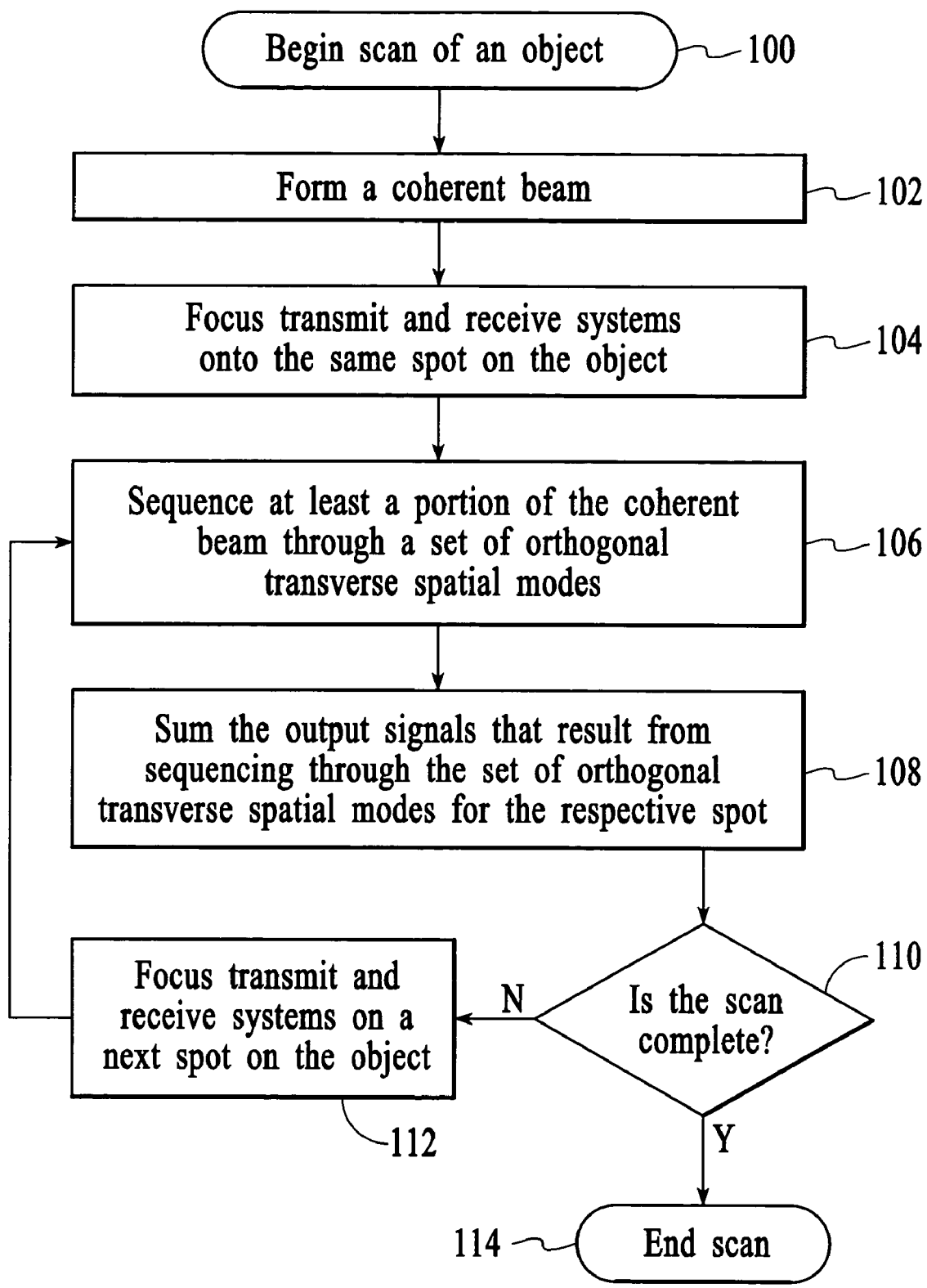
FIG. 3 is a high-level process flow diagram of a coherent imaging operation in accordance with an embodiment of the invention.

FIG. 3 is a high-level process flow diagram of the above-described imaging operation. Upon beginning an object scan 100, a coherent beam is formed, block 102. At block 104, the transmit and receive systems focus onto the same spot on the object. At block 106, at least a portion of the coherent beam is sequenced through a set of orthogonal transverse spatial modes. As described above with regard to FIGS. 2 and 3, the orthogonal transverse spatial modes can be generated at either the transmit or receive systems depending on the implementation. At block 108, the output signals that result from sequencing through the set of orthogonal transverse spatial modes are summed for the respective spot. At decision point 110, it is determined whether or not the scan is complete. If the scan is not complete, at block 112, the transmit and receive systems are focused onto a next spot on the object. Once the transmit and receive systems are focused onto the next spot, the process returns to block 106, where at least a portion of the coherent beam is sequenced through the set of orthogonal transverse spatial modes. The operations of blocks 106, 108, and 112 are repeated until the scan is complete, at which point the scan is ended 114.

Figure 4:
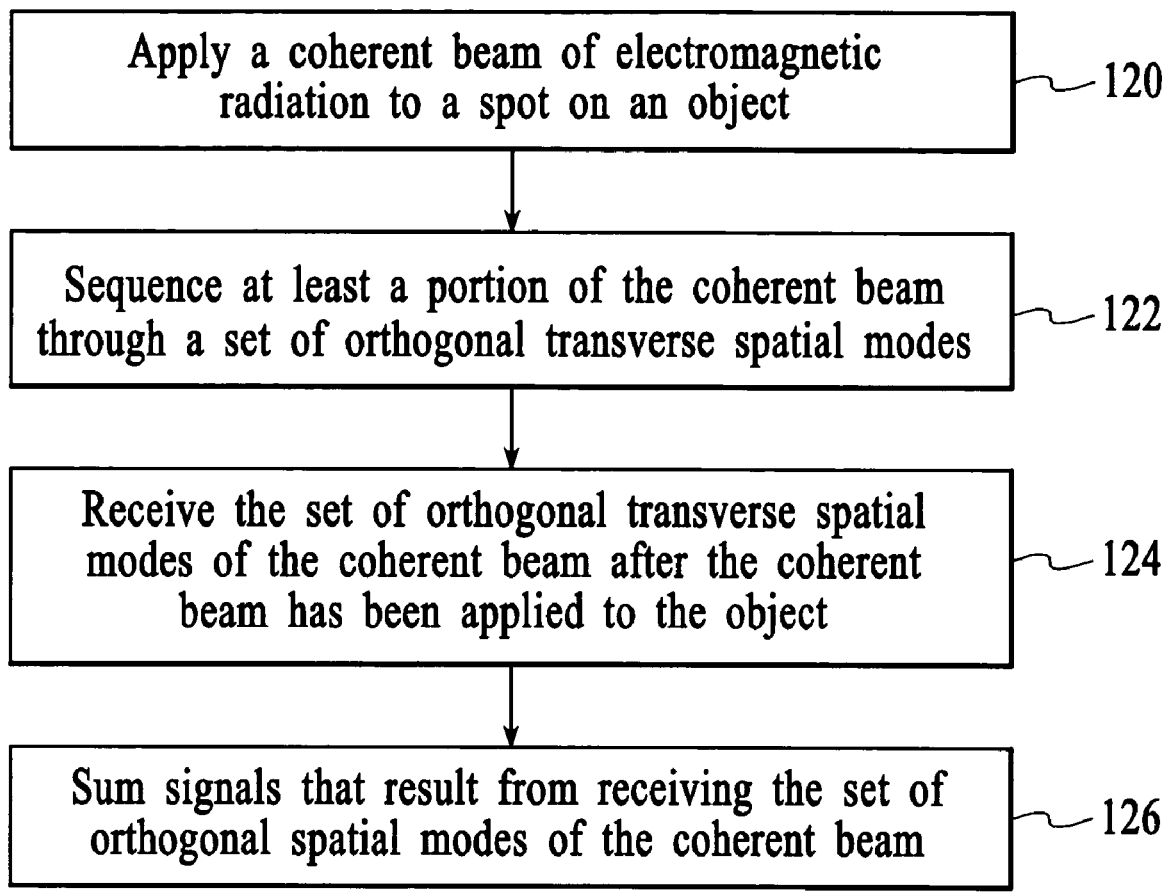
FIG. 4 is a process flow diagram of a method for imaging an object in accordance with an embodiment of the invention.

FIG. 4 is a process flow diagram of a method for imaging an object. At block 120, a coherent beam of electromagnetic radiation is applied to a spot on an object. At block 122, at least a portion of the coherent beam is sequenced through a set of orthogonal transverse spatial modes. At block 124, the set of orthogonal transverse spatial modes of the coherent beam is received after the coherent beam has been applied to the object. At block 126, signals that result from receiving the set of orthogonal spatial modes of the coherent beam are summed.

As stated above, a particularly suitable choice of orthogonal transverse spatial modes is a set of Hermite-Gaussian modes. In quantum mechanics, the Hermite-Gaussian functions appear as eigenfunctions of the harmonic oscillator problem; in fiber optics, they appear as eigenmodes of a fiber with quadratic index profile. The eigenfunctions and eigenmodes are mathematically equivalent problems. Some highly attractive properties of these functions are (1) locality, (2) orthonormality, (3) separability, and (4) they are their own Fourier transforms. Properties (1) and (4) imply that the beams can be focused using realistic optics, and in fact property (4) gives the recipe. Property (2) implies a significant anti-correlation between the modes. Property (3) indicates that the functions satisfy a two-dimensional differential equation which separates into two one-dimensional differential equations. In fact, the two-dimensional Hermite-Gaussians are just products of one-dimensional Hermite-Gaussians. This is not necessary but is a common and useful property.

Figure 6:
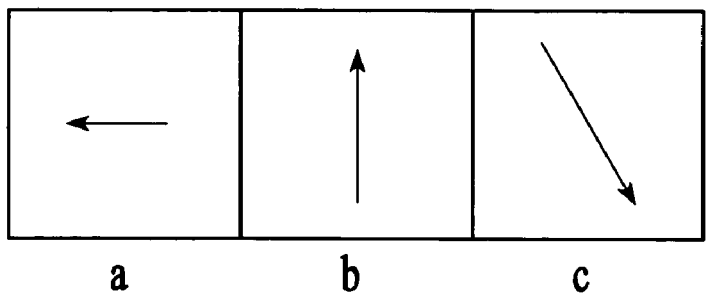
FIG. 6 depicts example beam vectors in the real-imaginary plane.
Figure 5:
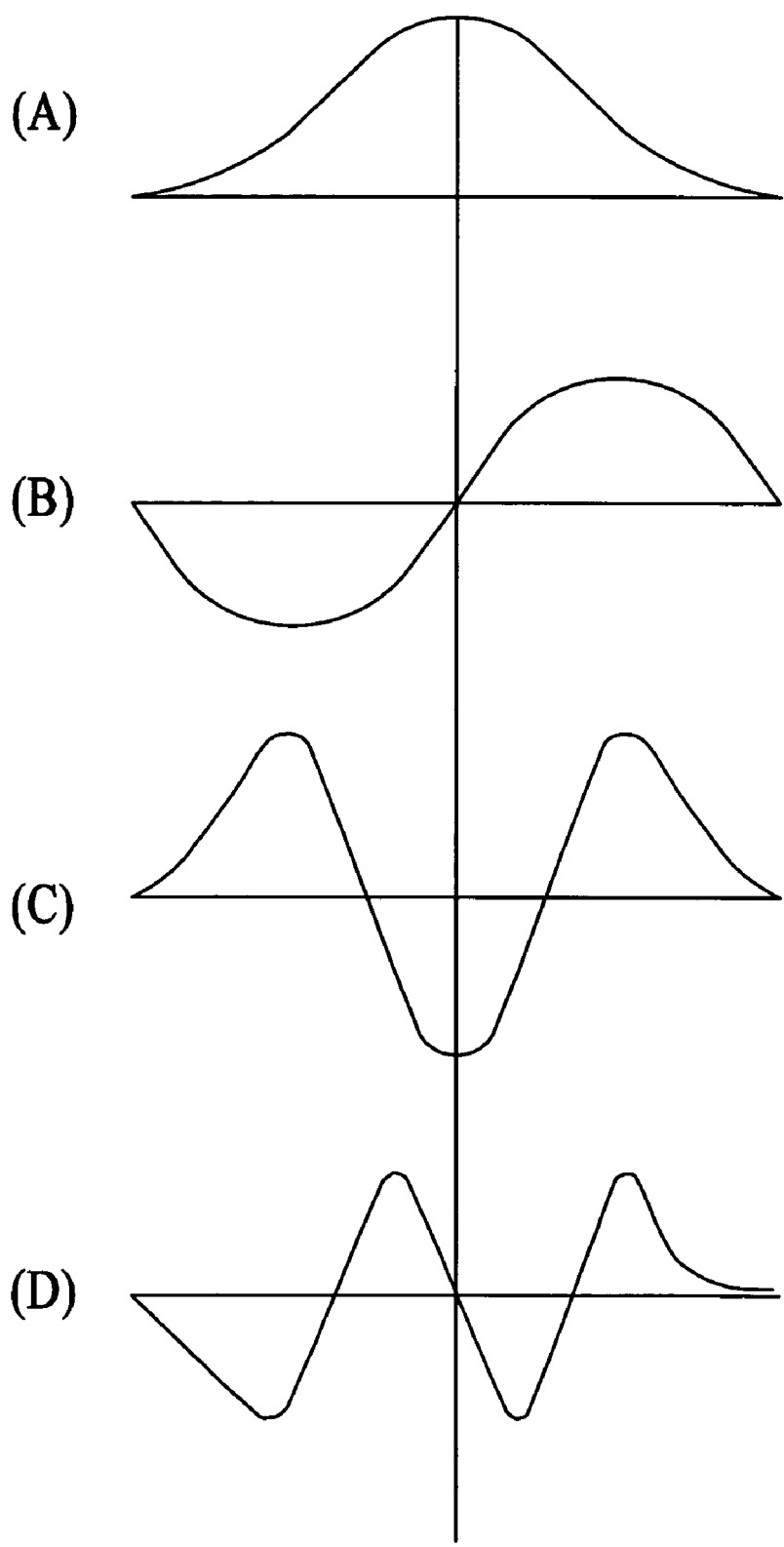
FIGS. 5A–5D depicts examples of the Hermite-Gaussian modes of a coherent beam.

The number of orthogonal transverse spatial modes needed to completely suppress speckle is on the order of the number of surface features per illuminated area. For holography, the basis would have to be enormous. For scanned, tightly focused microwave beams, the number of modes can be on the order of 1–10. That is to say, the speckle is really a local problem in the tightly focused case, rather than the highly non-local problem it is in typical laser illumination and the global problem it is in holography. A one-dimensional (curve) discrete example, shown in FIG. 6, helps to explain the behavior in the actual two-dimensional (surface) continuous case. Imagine a 1D illumination spot spanning three features of an object—this is equivalent to three emitters with complex amplitudes a, b, and c, represented as vectors in the real-imaginary plane in FIG. 6. It is desirable to estimate the incoherent sum of these emitters $|a|^2+|b|^2+|c|^2$ regardless of their phases. Three wavelet functions can be defined as:

$$W0=(1,1,1)/\sqrt{3},\ W1=(-1,0,1)/\sqrt{2},\ W2=(1,-2,1)/\sqrt{6}$$

The wavelets sample the curve and thus the dot products $Vi=Wi\cdot(a,b,c)$ are formed. By calculating $|V1|^2+|V2|^2+|V3|^2=|a|^2+|b|^2+|c|^2$, the incoherent sum is exactly obtained. Notice that as shown in FIG. 4, if just W0 was used (analogous to the usual single channel without diversity), a zero would have been obtained (e.g., a completely dark spot in the speckle pattern).

The above result is called Parseval's theorem in Fourier analysis. Alternatively, it is just the property of unitarity in quantum mechanics or scattering theory. It stems from the fact that the basis was not only orthonormal but complete. The theorem generalizes to any number of dimensions. It also generalizes to the continuous case but here an infinite number of basis functions is required for strict completeness. However, a goal is not exact measurement of the incoherent sum (now integral) of the emission but simply its estimation, just the first few lowest order terms in the infinite expansion will suffice.

Orthogonal transverse mode diversity imposes no extra cost. Since each Hermite-Gaussian is its own Fourier transform up to an irrelevant global phase, the same optics as used for the lowest order mode will work simply by spatial phase (and amplitude) modulation. This can be achieved mechanically but it is even easier electronically in phased arrays or reflectarrays. Spatial resolution is only slightly degraded as this is determined by the product of the transmit and receive beam spots. If Hermite-Gaussians are used, one of these beams (say, the transmit) is the lowest order 00 mode and the other (the receive) is sequenced through a finite set of modes, say {00,10,01} or perhaps {00,10,01, 20,11,02}. If mode mn carries the majority of the power then the resolution penalties Px and Py in the x and y directions are given by:

$$Px=\sqrt{(4m-1)}/\sqrt{(2m-1)}\ Py=\sqrt{(4n-1)}/\sqrt{(2n-1)}$$

In the limit that we need the complete infinite set of Hermite-Gaussians as the diversity basis, the radial resolution is only $\sqrt{2}$ worse than the case when only the 00 receive mode is used (the resolved area is twice as large). The only other penalty for orthogonal transverse mode diversity is that scanning time is proportional to the diversity factor for the same SNR.

The functionality that is described with reference to the functional block diagrams of FIGS. 1 and 2 can be divided up differently than what is shown. For example, the system controller and the summing unit may be integrated within the same microprocessor-based computer system. Additionally, although particular arrangements are described with reference to FIGS. 1 and 2, other arrangements of the specific elements are possible.

Although the coherent imaging system is described in terms of applications in the microwave and millimeter wave spectrums, the coherent imaging system could be used with other spectrum bands of electromagnetic radiation.

Although specific embodiments in accordance with the invention have been described and illustrated, the invention is not limited to the specific forms and arrangements of parts so described and illustrated. The invention is limited only by the claims.

What is claimed is:

1. An imaging system comprising:
   a transmit system configured to form a coherent beam of electromagnetic radiation and to focus the coherent beam onto a spot of an object;
   a receive system configured to receive a portion of the coherent beam that reflects off of the object;
   one of the transmit system and the receive system including a beam controller that is configured to sequence either the coherent beam that is focused onto a spot of the object or the portion of the coherent beam that reflects off of the object through a set of orthogonal transverse spatial modes; and
   summing logic in signal communication with the receive system and configured to sum signals generated in response to the set of orthogonal transverse spatial modes of the coherent beam.

2. The imaging system of claim 1 wherein the transmit system includes a transmit beam controller that is configured to sequence the coherent beam through the set of orthogonal transverse spatial modes.

3. The imaging system of claim 1 wherein the receive system includes a receive beam controller that is configured to sequence a portion of the coherent beam through the set of orthogonal transverse spatial modes.

4. The imaging system of claim 1 wherein the transmit and receive systems include transmit and receive beam controllers, respectively.

5. The imaging system of claim 4 further including a system controller configured to simultaneously focus the transmit and receive beam controllers onto the same spot on the object.

6. The imaging system of claim 5 wherein the system controller is further configured to scan an area of the object by sequentially moving the focus spot to different spots on the object.

7. The imaging system of claim 6 wherein the system controller is further configured to reset the summing logic each time the focus spot is moved.

8. The imaging system of claim 1 wherein the set of orthogonal transverse spatial modes correspond to the Hermite-Gaussian modes.

9. A method for imaging an object, the method comprising:
   applying a coherent beam of electromagnetic radiation to a spot on an object;
   sequencing at least a portion of the coherent beam through a set of orthogonal transverse spatial modes;
   receiving the set of orthogonal transverse spatial modes of the coherent beam after the coherent beam has been applied to the object; and
   summing signals that result from receiving the set of orthogonal spatial modes of the coherent beam.

10. The method of claim 9 further comprising applying the coherent beam to a next spot on the object and resetting the summing to correspond to the application of the coherent beam to the next spot.

11. The method of claim 9 wherein the coherent beam is sequenced through the set of orthogonal transverse spatial modes before it is applied to the object.

12. The method of claim 9 wherein the coherent beam is sequenced through the set of orthogonal transverse spatial modes after it is applied to the object.

13. The method of claim 9 wherein the set of orthogonal transverse spatial modes correspond to the Hermite-Gaussian modes.

14. An imaging system comprising:
   a transmit system including a coherent transmitter and a transmit beam controller, the coherent transmitter being configured to form a coherent beam of electromagnetic radiation that is directed towards the transmit beam controller, the transmit beam controller being configured to focus the coherent beam onto a spot on an object;
   a receive system including a coherent receiver and a receive beam controller, the receive beam controller being configured to direct the coherent beam that reflects off of the object to the coherent receiver, the coherent receiver being configured to receive the coherent beam from the receive beam controller;
   one of the transmit and receive beam controllers being additionally configured to sequence either the coherent beam that is focused onto a spot of the object or the portion of the coherent beam that reflects off of the object through a set of orthogonal transverse spatial modes; and
   summing logic in signal communication with the receive system and configured to sum signals from the coherent receiver.

15. The imaging system of claim 14 wherein the transmit and receive beam controllers are phased arrays or reflectarrays.

16. The imaging system of claim 14 further including a system controller configured to simultaneously focus the transmit and receive beam controllers onto the same spot on the object.

17. The imaging system of claim 16 wherein the system controller is further configured to scan an area of the object by sequentially moving the focus spot to different spots on the object.

18. The imaging system of claim 17 wherein the system controller is further configured to reset the summing logic each time the focus spot is moved.

19. The imaging system of claim 14 wherein the set of orthogonal transverse spatial modes correspond to the Hermite-Gaussian modes.

20. The imaging system of claim 14 wherein the summing logic is reset after the coherent beam is sequenced through the set of orthogonal transverse spatial modes.

* * * * *